United States Patent [19]
Phillips

[11] Patent Number: 5,722,878
[45] Date of Patent: Mar. 3, 1998

[54] METHOD AND APPARATUS FOR MICROFINISHING

[75] Inventor: James D. Phillips, Posen, Mich.

[73] Assignee: J. D. Phillips Corporation, Alpena, Mich.

[21] Appl. No.: 519,725

[22] Filed: Aug. 28, 1995

[51] Int. Cl.$^6$ ............................................. B24B 19/06
[52] U.S. Cl. ........................... 451/49; 451/163; 451/173
[58] Field of Search ............................ 451/49, 163, 164, 451/173, 324, 397, 398, 399, 165

[56] References Cited

U.S. PATENT DOCUMENTS

| | | | |
|---|---|---|---|
| 2,302,105 | 11/1942 | Connor | 451/173 |
| 3,267,551 | 8/1966 | Judge | 29/90 |
| 3,643,379 | 2/1972 | Testolin | 51/6 |
| 4,226,055 | 10/1980 | Komanduri et al. | 451/56 |
| 4,419,845 | 12/1983 | Voigt et al. | 51/42 |
| 4,437,328 | 3/1984 | Wittkopp et al. | 72/110 |
| 4,555,873 | 12/1985 | Smith | 451/21 |
| 4,573,289 | 3/1986 | Wieck | 451/173 |
| 4,682,444 | 7/1987 | Judge et al. | 51/154 |
| 4,747,285 | 5/1988 | Berstein et al. | 72/110 |
| 4,766,753 | 8/1988 | Berstein et al. | 72/110 |
| 4,945,683 | 8/1990 | Phillips | 51/145 |
| 4,993,191 | 2/1991 | Judge et al. | 51/154 |
| 5,060,423 | 10/1991 | Klotz | 451/49 |
| 5,187,899 | 2/1993 | Rhoades | 451/164 |
| 5,245,793 | 9/1993 | Schmitz | 451/49 |
| 5,289,660 | 3/1994 | Terasaki et al. | 451/49 |
| 5,447,463 | 9/1995 | Schmitz | 451/49 |

FOREIGN PATENT DOCUMENTS

| | | |
|---|---|---|
| 0027272 | 10/1980 | European Pat. Off. . |
| 1507495 | 4/1967 | France . |
| 998104A | 6/1983 | Russian Federation . |
| 2104431 | 3/1983 | United Kingdom . |

*Primary Examiner*—Eileen P. Morgan
*Attorney, Agent, or Firm*—Barnes, Kisselle, Raisch, Choate, Whittemore & Hulbert, P.C.

[57] ABSTRACT

A method of microfinishing a surface of a workpiece in which a shoe is pressed against the surface of the workpiece while the workpiece is rotating. The shoe is vibrated at a high frequency and is made of diamond or similar very hard material. Apparatus for carrying out the method includes a drive for rotating the workpiece, a linear actuator for pressing the shoe against the rotating workpiece, and a vibrator for vibrating the shoe.

21 Claims, 9 Drawing Sheets

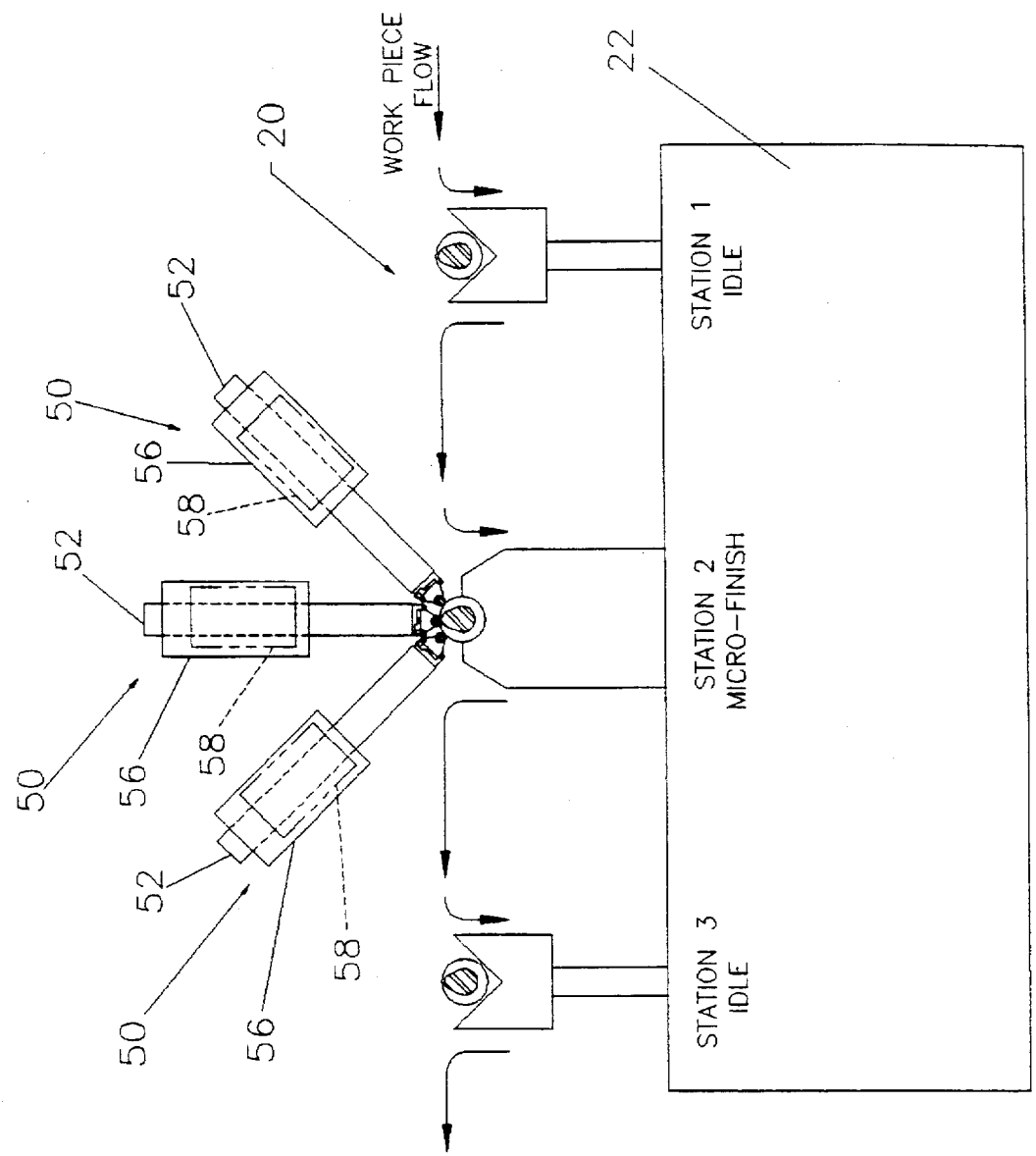

METHOD AND APPARATUS FOR MICROFINISHING

FIELD OF THE INVENTION

This invention relates to a method and apparatus for improving the finish and hardness of the surface of a workpiece, such, for example, as camshaft lobes, camshaft bearing journals and crankshaft pin and bearing journals.

BACKGROUND OF THE INVENTION

In accordance with present practice, the lobes or bearing surfaces on a workpiece such as a camshaft or crankshaft are microfinished by abrading them smooth with either sand paper or stones while the workpiece is rotated about its longitudinal axis.

Although this process improves the surface finish, it does not add to the hardness. It can, in fact, reduce the hardness because it removes material from the finished surface.

Also, the amount of material being removed by this process varies on non-round surfaces. This is because both sand paper and stones tend to remove more material from surfaces of small radius, like the nose of a camshaft lobe, than from surfaces of large radius like the base circle of a lobe or flat surfaces such as ramp areas. This non-uniform removal of stock forces the manufacturer to alter the desired shape before microfinishing. The alteration is difficult, not predictable and requires trial and error to accomplish.

Abrading with sand paper or stones creates a swarf which is composed of the material being removed, particles of sand or stone and the oil or solution being used. Because of environmental problems, disposal of this swarf is very difficult and expensive.

Also, this process requires frequent changing of the sand paper or stones as they wear out, which is expensive, very time consuming and presents additional disposal problems.

There are other processes that use rollers to smooth and harden a workpiece and such processes are commonly referred to as "burnishing". However, burnishing is only used on workpieces that have round inside or outside diameters. Burnishing is not suitable for processing non-round workpieces such as camshaft lobes. Also, burnishing, because of the very high forces involved, requires that the rollers and forces are diametrically opposed so as not to bend or break the workpiece.

SUMMARY OF THE INVENTION

In accordance with the present invention, a relatively smooth, very hard shoe made of diamond or plated tungsten carbide, for example, vibrating at a high frequency in a direction 90° to the rotational axis of the workpiece, is pressed against the surface to be microfinished while the workpiece is rotating.

The high frequency vibration allows enough force to be applied to the surface to sufficiently compress it to improve the hardness as well as improve the quality of the finish. The high frequency vibration also reduces internal stresses in the workpiece which may have resulted from a prior straightening or heat treatment process. The mass of the workpiece itself absorbs most of the energy required to microfinish the surface without pushing the shoe against the workpiece with so much force that the workpiece is caused to bend or deflect in the opposite direction.

Preferably, linear motors are used to actuate the slide assemblies that press the shoe against the workpiece. Because linear motors require no ball screw to convert rotary motion to linear motion, it is possible to maintain a constant force against the workpiece throughout its stroke. The shoe is forced back when the high part of the lobe on the rotating workpiece passes under it. Pneumatic cylinders could also be used to actuate the slide assemblies and provide constant force throughout the stroke.

Because the method of the present invention does not remove any material, the shape of the workpiece is not altered, enabling the manufacturer to grind the workpiece to the shape desired. Altering the shape before microfinishing with this invention is not necessary.

Also, because no material is being removed, this method does not produce any swarf which is difficult to dispose of. Because no sanding or stoning is involved, the cost and time of changing sand paper or stones is eliminated.

The shoe preferably is constructed to have either a cylindrical or a flat contact surface, with its axis or plane parallel to the axis of the workpiece. The surface finish of the shoe should be as smooth as or smoother than the desired finish on the workpiece. The shoe is made of a very hard material, preferably diamond or tungsten carbide plated with a compound such, for example, as chromium nitride or titanium nitride. The plating compound should be very hard, in the range of 3000 to 7000 Vickers hardness and should be inert, so as not to react chemically with the workpiece material and cause damage or erosion to either surface. It must also withstand the pressure and rubbing action required to change the microfinish of the surface of the workpiece.

A modified cylindrical shoe may have a slight "barrel" or "hour glass" shape. A modified generally flat shoe may be slightly concave or convex. These modified shapes will transfer the opposite shape to the surface being microfinished.

One object of the invention is to provide a method and apparatus for microfinishing a workpiece having the foregoing features and capabilities.

Another object is to provide microfinishing apparatus of a rugged and durable construction, which can be readily manufactured and easily operated.

Other objects, features and advantages will become more apparent as the following description proceeds, especially when considered with the accompanying drawings.

BRIEF DESCRIPTION OF THE DRAWINGS

FIG. 2a is a sectional view taken on the line 2a—2a in FIG. 1a.

DETAILED DESCRIPTION OF THE PREFERRED EMBODIMENTS

Figure 1:
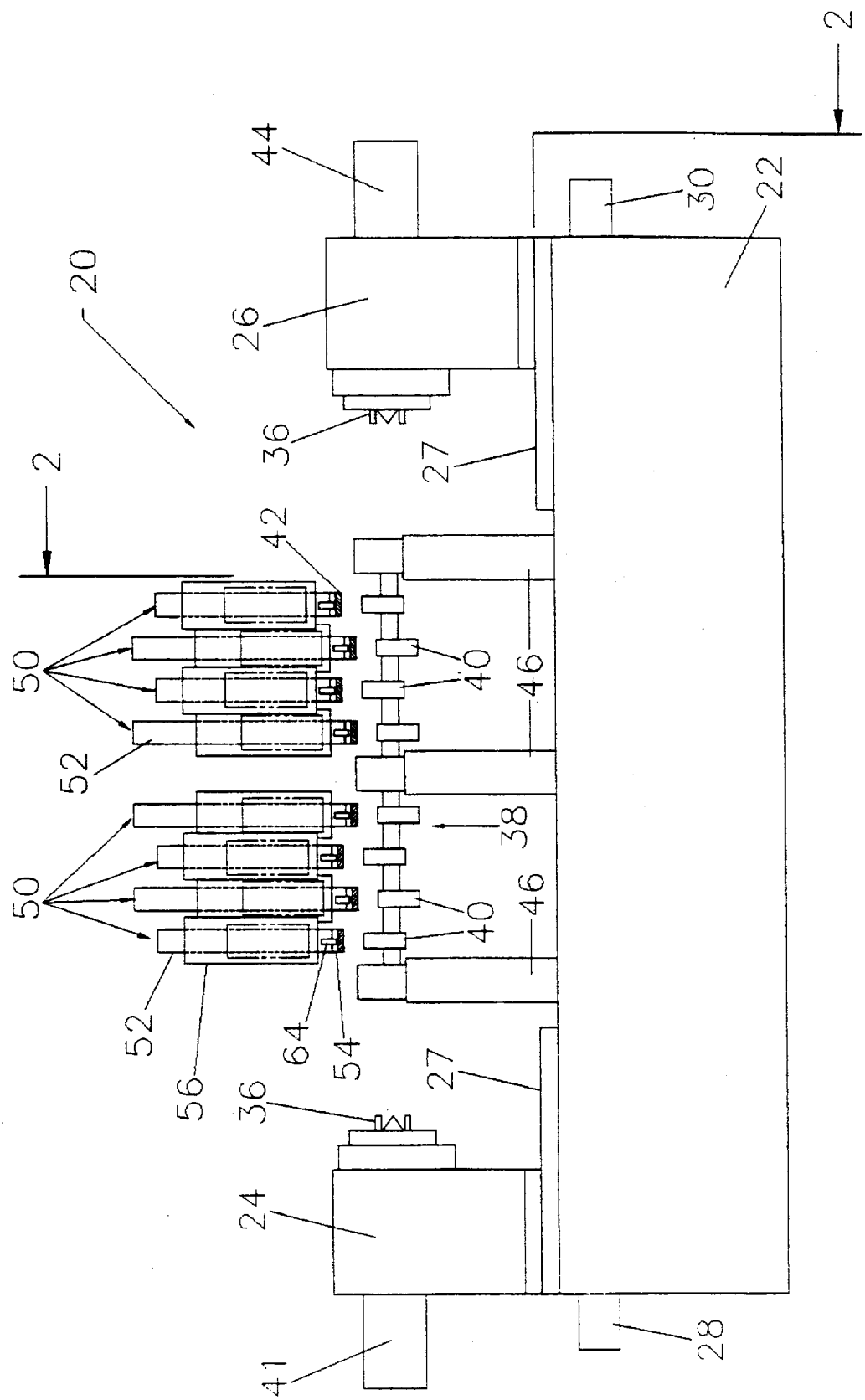
FIG. 1 is a front elevational view of apparatus constructed in accordance with this invention in the "load and unload" mode showing the heads and slides retracted. The "idle station 1" shown in FIGS. 2 and 2a are not shown so that the microfinish station can be seen more clearly.

Referring now more particularly to the drawings, and especially to FIGS. 1–3a, the microfinishing machine 20 has a main machine frame or bed 22 on which are mounted the laterally spindle assemblies 24 and 26. The spindle assemblies 24 and 26 are mounted on suitable ways 27 for movement toward and away from each other by motors 28 and 30. The spindle assemblies 24 and 26 have drivers 36 which are engageable with opposite ends of the workpiece which in this instance is an elongated camshaft 38 having longitudinally spaced apart lobes 40. Drive motors 41 and 44 rotate the drivers 36 which in turn rotate the camshaft at constant speed about its longitudinal axis. Steadyrests 46 engage intermediate and end portions of the camshaft and support it against the forces generated during the microfinishing operation.

The lobes 40 on the camshaft are microfinished by microfinishing shoes 42. Each shoe is carried by a slide assembly 50. More specifically, each slide assembly comprises an elongated slide 52 opposite a cam lobe, and a head 54 on the end of the slide adjacent the lobe. The shoes 42 are mounted on the heads 54. The slides 52 extend perpendicular to the camshaft and are mounted in guides 56 for longitudinal sliding movement toward and away from the camshaft. Each slide is moved toward and away from the camshaft preferably by a linear motor 58 which presses the shoe against a cam lobe with a constant and uniform force. Pneumatic cylinders or other motors may be substituted for the linear actuators, but it is desired that the force of each shoe against its cam lobe be constant and uniform during the entire microfinishing operation.

Figure 1A:
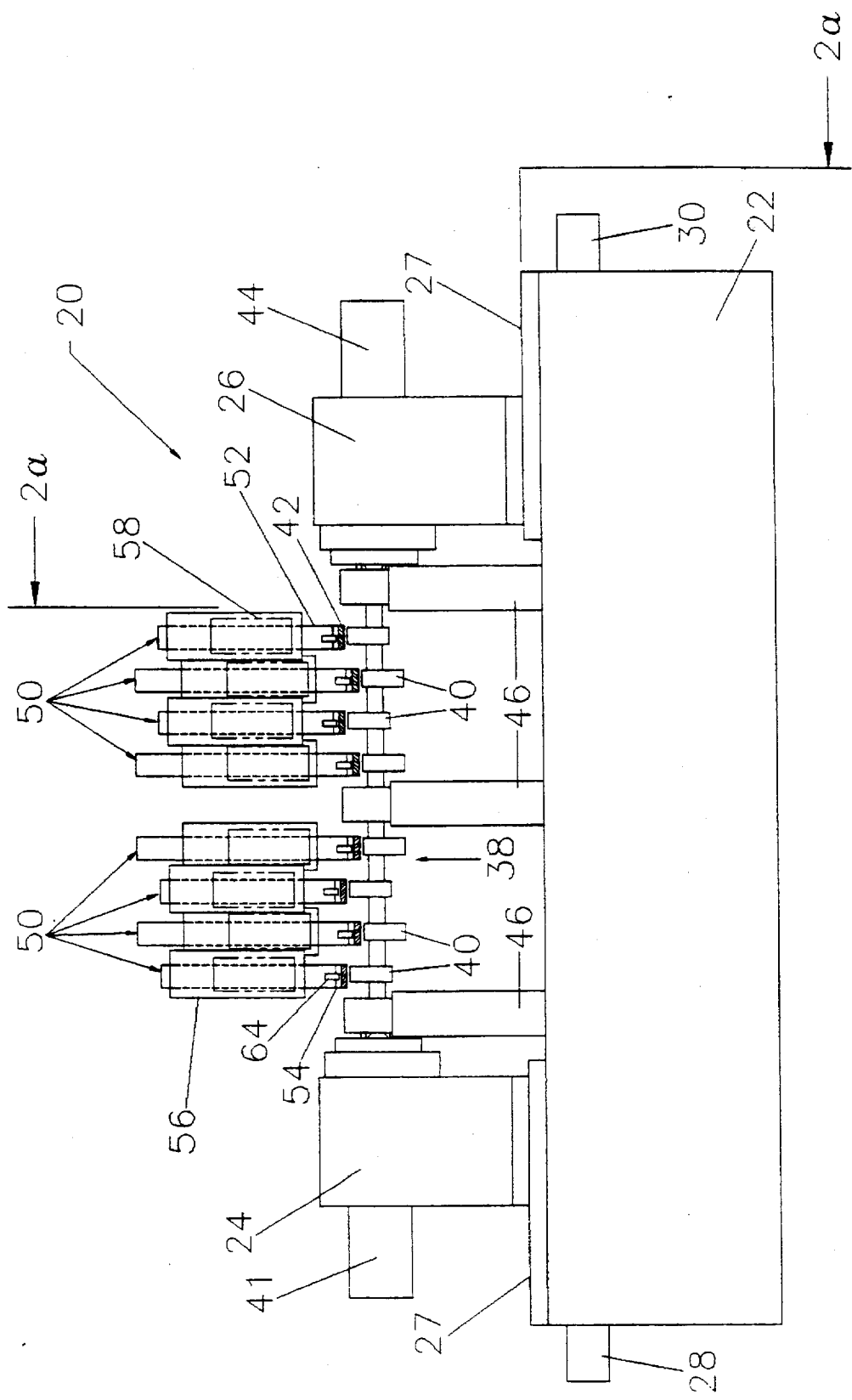
FIG. 1a is similar to FIG. 1 but in the operating mode showing the heads and slides in the advanced position. The "idle station 1" is also deleted for the same reason.
Figure 2:
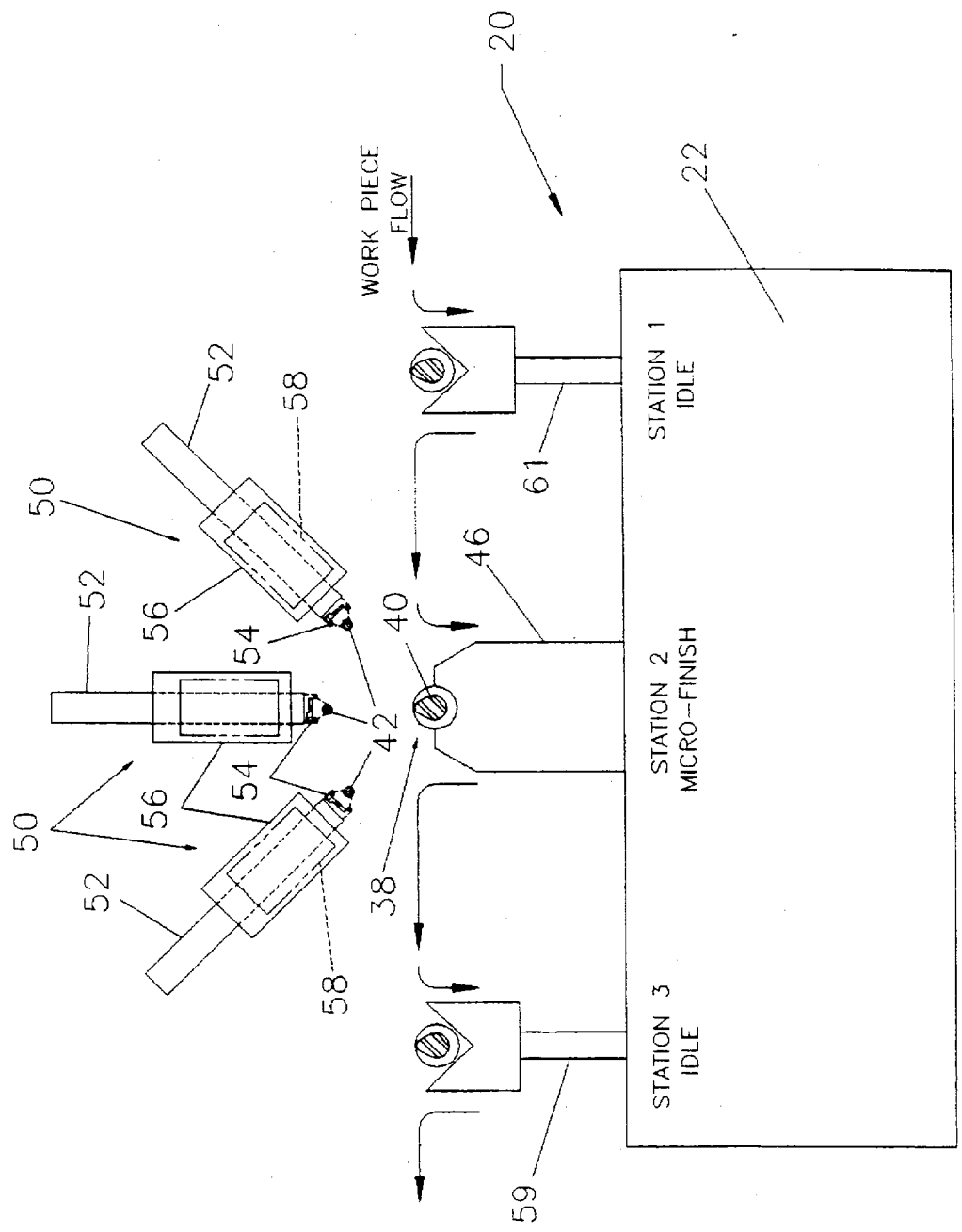
FIG. 2 is a sectional view taken on the line 2—2 in FIG. 1.
Figure 3:
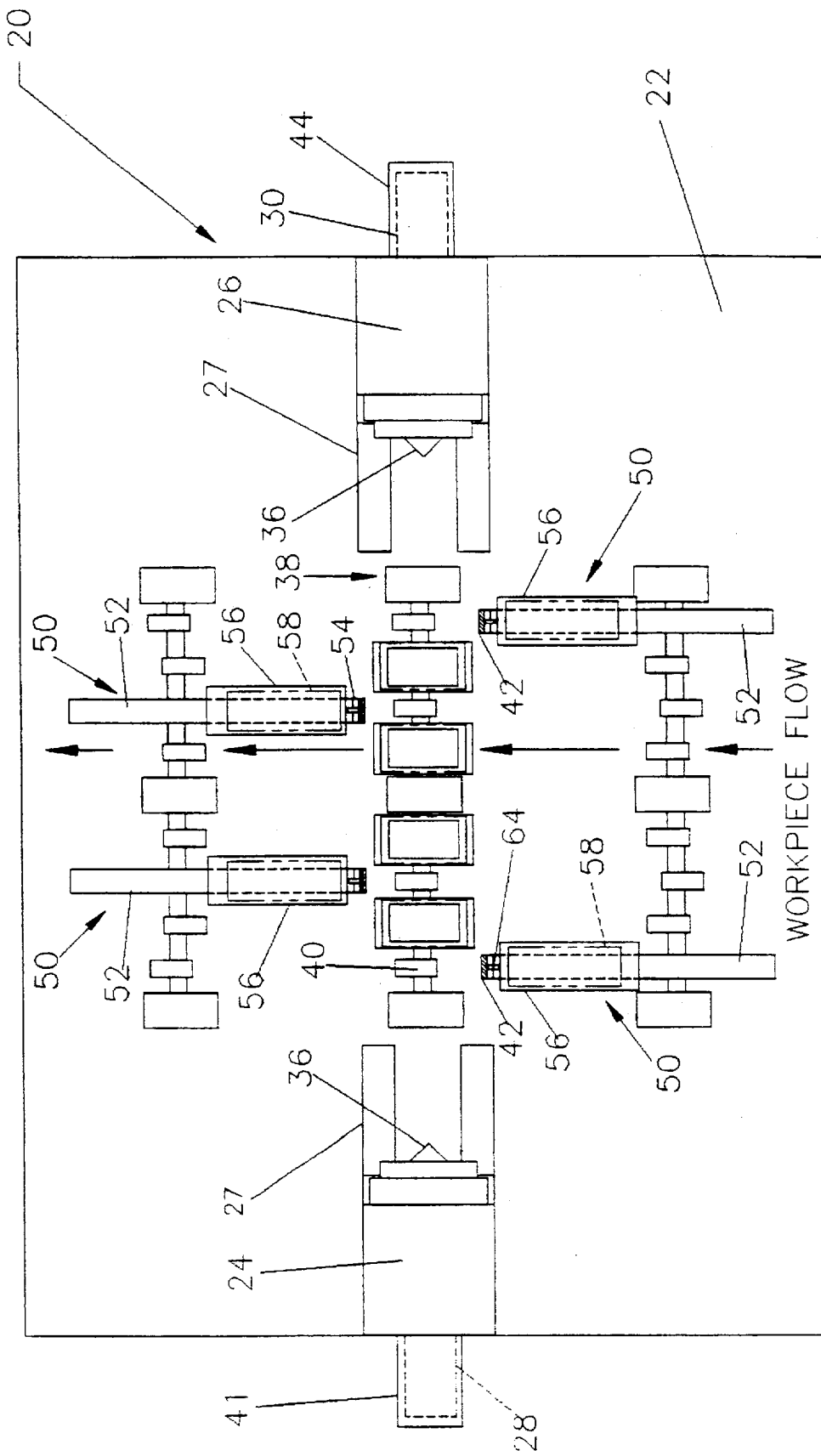
FIGS. 3 and 3a are top plan views of the apparatus shown in FIGS. 1 and 1a, respectively.
Figure 3A:
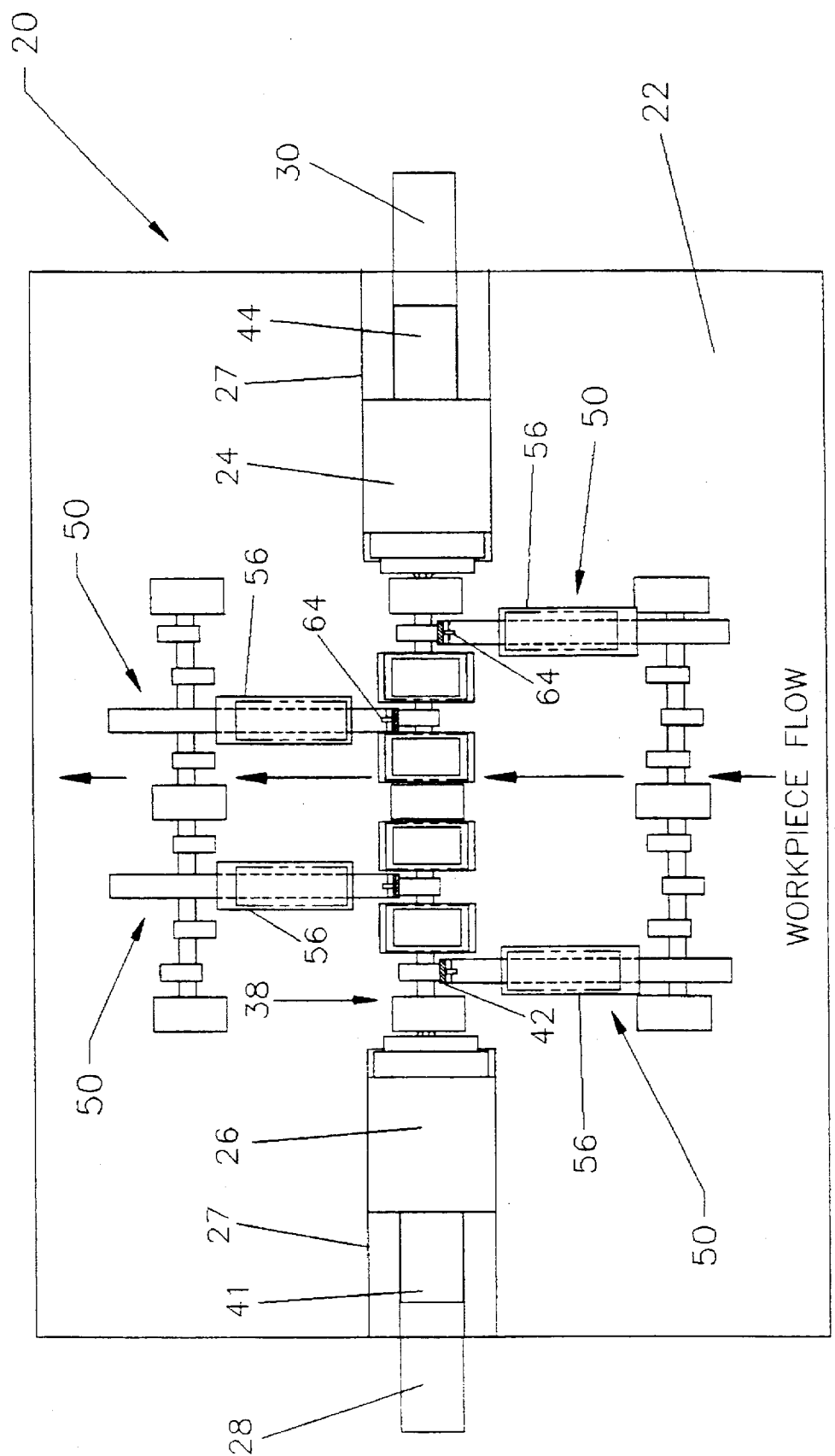

The slide guides 56 are mounted on fixed portions of the machine (not shown) in positions such that slides 52 on which the shoes are mounted are located in different planes spaced approximately 45° from one another (see FIGS. 2 and 2a) to enable the machine to microfinish workpiece lobes that are closer to each other than the width of the slide assemblies. FIGS. 1, 2 and 3 show the machine in the "load and unload" mode in which all of the shoes and slides are in the retracted position. FIGS. 1a, 2a and 3a show the microfinishing machine in the operating mode with the shoes and slides in the advanced position during which time the shoes engage the lobes for microfinishing.

FIGS. 2 and 2a show the camshaft supported at a microfinish station 2 between two idle stations 1 and 3 where camshafts may be supported on stands 59 and 61 before and after processing at the station 2. A standard "lift and carry" mechanism (not shown) may be employed to transfer camshafts from station to station.

On the head 54 of each slide assembly 50 is a vibrator 60. The vibrators 60 are for the purpose of causing the shoe 42, while pressed against a cam, to vibrate. The vibrations are perpendicular to the surface of the lobe. The vibrations preferably are at a frequency in a range of about 10,000 to 16,000 cycles per minute. The high frequency vibrations allow enough force to be applied to the surface of the lobe to compact and compress the surface and improve its hardness as well as improve the quality of its finish. Excessive force is not required and will vary depending on the width of the cam lobe surface being microfinished. This force for lobes that are only 0.5" wide might be 50 to 100 lbs. For a 2" wide lobe the force might be 400 lbs. This force is kept constant and does not vary throughout the microfinishing process. The lobe actually pushes the shoe back when the high part of the lobe passes under the shoe, so that the force of the shoe on the lobe surface stays the same. The length of the shoe 42 is greater than the width of the lobe so that the entire width of the lobe is processed.

Figure 4:
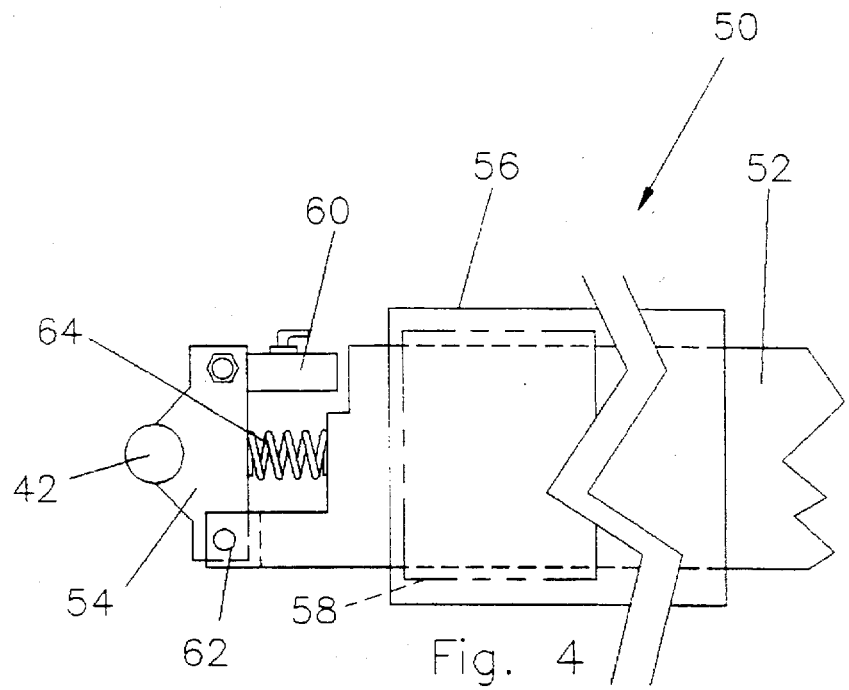
FIG. 4 is an enlarged fragmentary view showing one type of microfinishing slide and head with vibrator.
Figure 6:
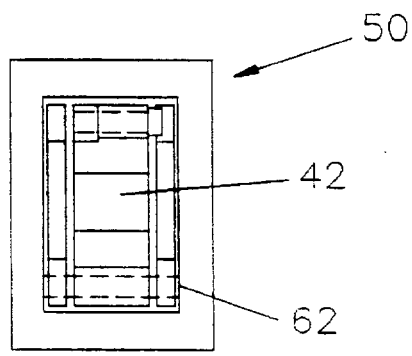
FIG. 6 is an enlarged front view of the microfinishing head of FIG. 4.

FIGS. 4 and 6 shows one embodiment of a slide assembly in which the shoe 42 is a cylindrical bar of uniform circular cross section throughout its length, with its central longitudinal axis parallel to the axis of rotation of the camshaft and parallel to the surface of the lobe being processed.

The head 54 is pivoted to slide 52 on a pin 62 for pivotal movement on an axis parallel to the longitudinal axis of the shoe. The head 54 is pressed toward the lobe by a compression coil spring 64 between the head and the slide. The vibrator 60 is shown mounted on the head 54. When the slide assembly 50 advances a shoe against the lobe, the spring 64 compresses to ensure that the shoe remains in contact with the lobe while the workpiece is rotating. The vibrator 60 is rigidly mounted on the head and when energized will cause the head and shoe to vibrate at a high frequency with the energy being forced into the workpiece. This energy or force is absorbed by the surface of the lobe resulting in the lobe surface becoming hard and smooth. This microfinishing of the lobe surface takes place as the workpiece is rotating at a constant speed, preferably about 20–30 RPM.

The shoe 42 may, if desired, be modified by making it in a "barrel" or "hour-glass" shape, which will transfer the opposite shape to the surface being microfinished.

The shoe is made of a very hard material. It preferably has a hardness in a range of about of 3000 to 7000 Vickers. Preferably, the shoe is made of a material which will not react chemically with the workpiece. The workpiece is usually made of iron or steel but may be made of other materials. Preferably, the shoe is made of diamond or tungsten carbide. If made of tungsten carbide, it is preferably plated with a compound which may be either chromium nitride or titanium nitride which have a hardness within the above-stated range.

The surface of the shoe, whether of diamond or plated tungsten carbide, is smooth and has a rubbing action on the surface of the cam lobe during the microfinishing process on the rotating workpiece. The surface of the shoe in contact with the workpiece must be sufficiently hard and smooth to withstand the rubbing action.

Other suitable materials of which the shoe may be made are silicon nitride and certain ceramic materials such as aluminum oxide ($Al_2O_3$).

Figure 5:
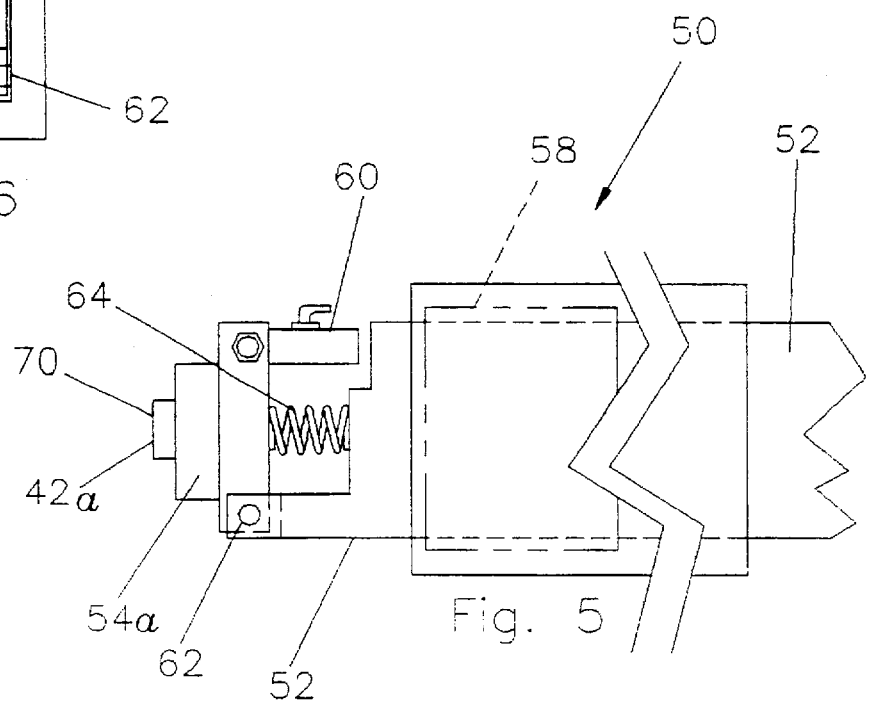
FIG. 5 is an enlarged fragmentary view of another type of microfinishing slide and head with vibrator.

FIG. 5 shows an embodiment similar to FIG. 4 but in which the head 54a is of a slightly different configuration although similarly pivoted on the slide 52 by a pivot pin 62. The only essential difference between the head of FIG. 5 and that of FIG. 4 is that the shoe 42a of FIG. 5 is in the form of a flat block rather than a cylinder, and has a flat workpiece-engaging surface 70 which is parallel to the axis of rotation of the camshaft and also parallel to the surface of the cam lobe being microfinished.

Figure 7:
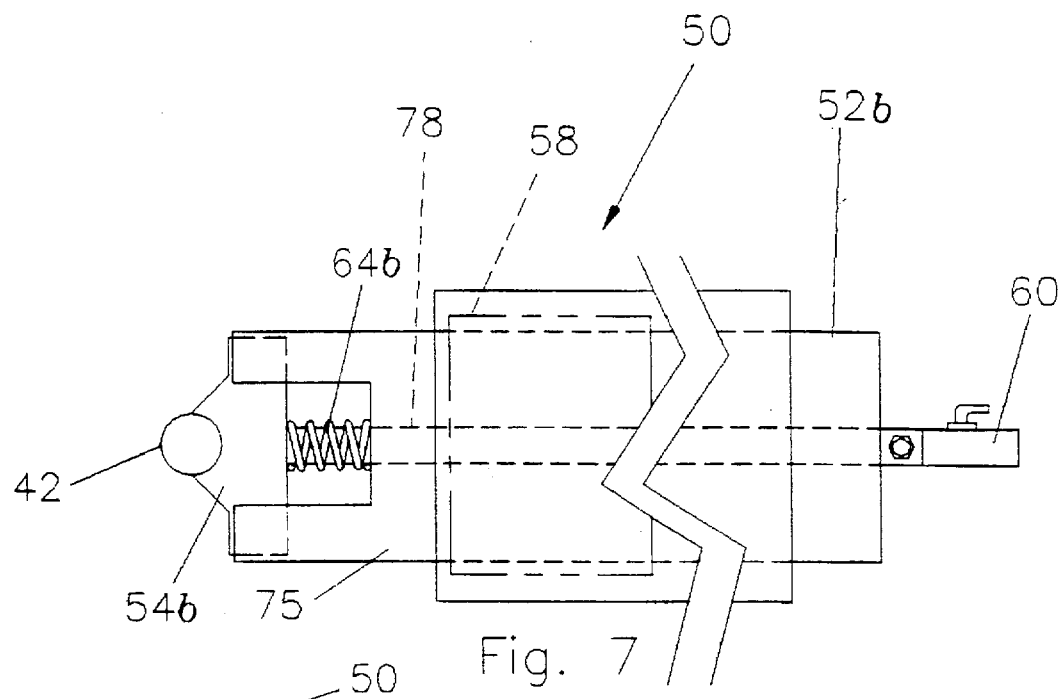
FIG. 7 is an enlarged fragmentary view of still another type of microfinishing slide and head with vibrator.
Figure 9:
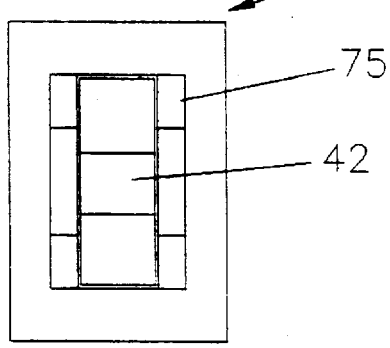
FIG. 9 is an enlarged front view of the microfinishing head of FIG. 7.

FIGS. 7 and 9 show still another embodiment in which the shoe 42 is secured to a head 54b that slides between the arms 75 of the slide 52b in a direction lengthwise of slide 52b. A coil spring 64b is compressed between the head 54b and the slide 52b and encircles a rod 78 extending from head 54b. The rod 78 is slidable in slide 52b and has a vibrator 60 on the end remote from the head. The operation is obvious from the description of the other embodiments.

Figure 8:
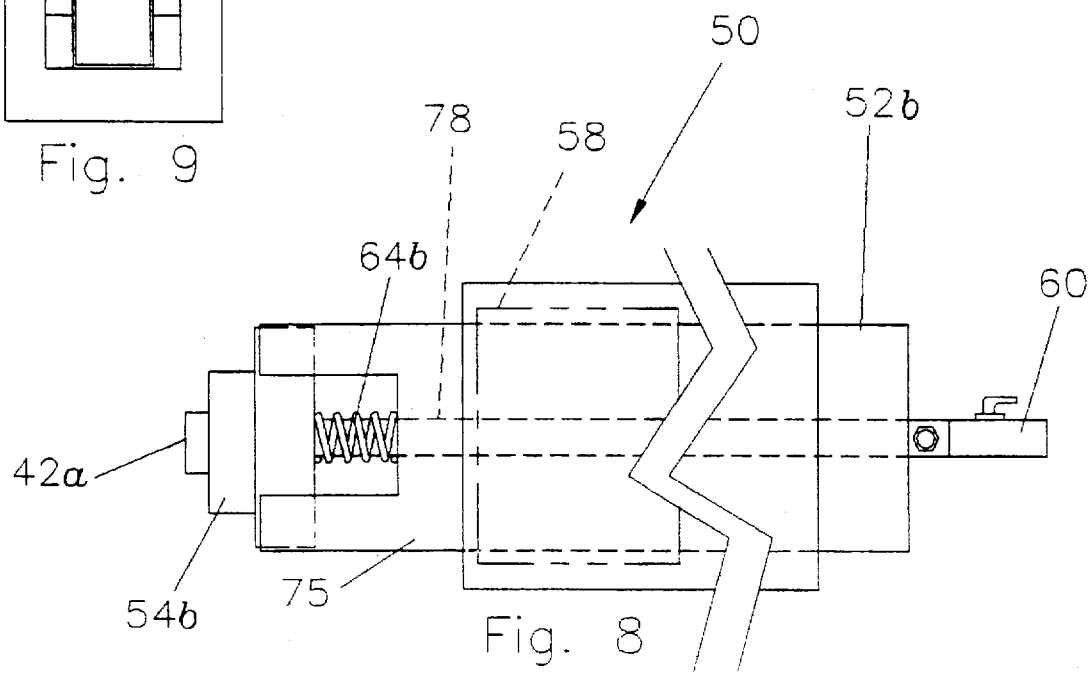
FIG. 8 is an enlarged fragmentary view of a further type of microfinishing slide and head with vibrator.

FIG. 8 differs from FIGS. 7 and 9 only in that the shoe 42a is flat like shoe 42a in FIG. 5.

A modified generally flat shoe may be slightly concave or convex in which case it will transfer the opposite shape to the surface being microfinished.

Figure 10:
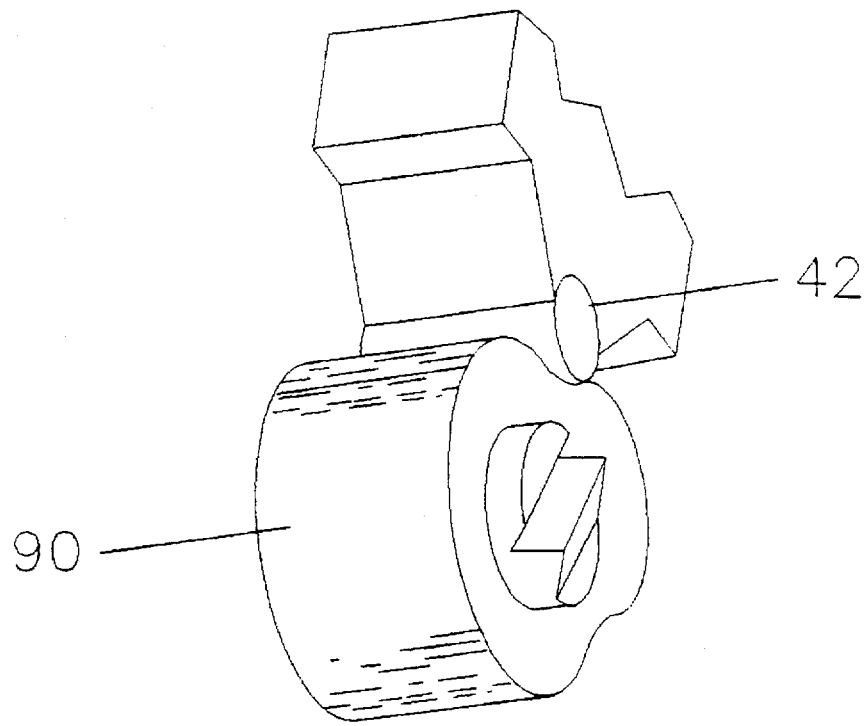
FIG. 10 is a perspective view showing a cylindrical shoe engaged with a typical "roller follower" camshaft lobe.

Reference is now made to FIG. 10 which shows the cylindrical shoe 42 of FIG. 4 engaged against a typical "roller follower" camshaft lobe 90. The re-entry curve or negative radius of this lobe style can best be microfinished with a cylindrical shoe of the type shown in FIG. 4. The flat type of shoe 42a shown in FIG. 5 would not be suitable for microfinishing a re-entry curve or negative radius portion of a lobe.

Figure 11:
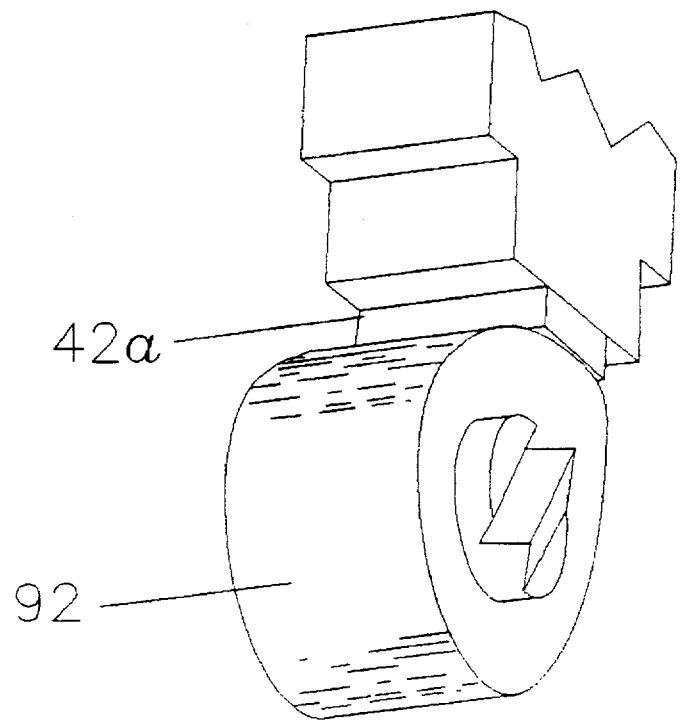
FIG. 11 is a perspective view showing a flat shoe engaged with a "flat follower" camshaft lobe.

FIG. 11 shows the flat shoe 42a of FIG. 5 against a typical "flat follower" camshaft lobe 92. This lobe surface has a positive radius and lacks a re-entry curve or negative radius and hence this shape of cam lobe allows the use of the simpler and less expensive flat shoe of the type shown in FIG. 5.

I claim:

1. Apparatus for microfinishing a surface of a workpiece, comprising a workpiece support, a shoe, means mounting said shoe adjacent to a workpiece on the support, means for holding said shoe in engagement with a surface of the workpiece, and means for vibrating the shoe generally perpendicular to the surface of the workpiece at a frequency of at least about 10,000 cycles per minute while it is engaged with the surface of the workpiece to micro-finish the surface, said shoe having a hardness of at least about 3000 Vickers.

2. Apparatus as defined in claim 1, wherein said shoe has a smooth surface in contact with the surface of the workpiece, and further including means for relatively moving said shoe laterally over said surface of the workpiece while the shoe is vibrating so that the surface of said shoe has a rubbing action thereon.

3. Apparatus as defined in claim 1, wherein said shoe has a smooth surface in contact with the surface of the workpiece, and further including means for rotating the workpiece while the shoe is vibrating so that the shoe has a rubbing action on the surface thereof.

4. Apparatus as defined in claim 1, wherein said shoe is vibrated by said vibrating means at a frequency in a range of about 10,000 to 16,000 cycles per minute.

5. Apparatus as defined in claim 1, wherein said shoe has a hardness in a range of about 3000 to 7000 Vickers.

6. Apparatus as defined in claim 1, wherein said shoe is made of diamond.

7. Apparatus as defined in claim 1, wherein said shoe is made of tungsten carbide.

8. Apparatus as defined in claim 1, wherein said shoe is made of tungsten carbide and is plated with a compound selected from the group consisting of chromium nitride and titanium nitride.

9. Apparatus as defined in claim 1, wherein said shoe is made of ceramic material.

10. Apparatus as defined in claim 1, wherein said shoe is made of silicon nitride.

11. Apparatus as defined in claim 1, wherein said shoe has a smooth cylindrical surface which is in pressure contact with the surface of the workpiece and has a longitudinal axis parallel to the surface of the workpiece.

12. Apparatus as defined in claim 1, wherein said shoe has a smooth flat surface in pressure contact with the surface of the workpiece and is disposed in a plane generally parallel to the surface of the workpiece.

13. A method of microfinishing a surface of a workpiece comprising providing a shoe, and holding the shoe in pressure contact with a surface of the workpiece while vibrating the shoe generally perpendicular to the surface of the workpiece at a frequency of at least about 10,000 cycles per minute to a micro-finish the surface, said shoe having a hardness of at least about 3000 Vickers.

14. A method as defined in claim 13, wherein the shoe has a smooth surface in contact with the surface of the workpiece, and relatively moving the shoe laterally over the surface of the workpiece while the shoe is vibrating so that the surface of the shoe has a rubbing action on the surface of the workpiece.

15. A method as defined in claim 13, wherein the shoe has a smooth cylindrical surface which is in pressure contact with the surface of the workpiece and has a longitudinal axis parallel to the surface of the workpiece, and relatively moving the shoe laterally over the surface of the workpiece while the shoe is vibrating so that the surface of the shoe has a rubbing action on the surface of the workpiece.

16. A method as defined in claim 13, wherein the shoe is vibrated at a frequency in a range of about 10,000 to 16,000 cycles per minute.

17. A method as defined in claim 13, wherein said shoe is made of diamond.

18. A method as defined in claim 13, wherein said shoe is made of tungsten carbide.

19. A method as defined in claim 13, wherein said shoe is made of tungsten carbide and is plated with a compound selected from the group consisting of chromium nitride and titanium nitride.

20. A method as defined in claim 13, wherein said shoe is made of ceramic material.

21. A method as defined in claim 13, wherein said shoe is made of silicon nitride.

* * * * *